United States Patent

[11] 3,572,554

| [72] | Inventor | Richard S. Kubik<br>1030 Villa Vista Drive, Colby, Kans. 67701 |
|---|---|---|
| [21] | Appl. No. | 789,149 |
| [22] | Filed | Jan. 6, 1969 |
| [45] | Patented | Mar. 30, 1971 |

[54] PESTICIDE APPLICATOR
4 Claims, 7 Drawing Figs.

[52] U.S. Cl. .................................................. 222/246, 222/505
[51] Int. Cl. .................................................. G01f 1/12
[50] Field of Search .................................................. 222/473, 474, 509, 174, 505, 230, 246, 196; 251/294, 295

[56] References Cited
UNITED STATES PATENTS
| 521,487 | 6/1894 | Turner | 222/473 |
|---|---|---|---|
| 1,354,626 | 10/1920 | Service | 222/230X |
| 1,558,439 | 10/1925 | Schilplin | 222/174X |
| 2,004,203 | 6/1935 | Howell | 222/509X |
| 2,223,854 | 12/1940 | Peaster | 251/294X |
| 3,106,322 | 10/1963 | Lynskey | 222/505X |

*Primary Examiner*—Samuel F. Coleman
*Assistant Examiner*—Norman L. Stack, Jr.
*Attorney*—John A. Hamilton ABSTRACT: A pesticide applicator consisting of an elongated tube having one end sharpened for insertion into a rodent burrow or the like, means for attaching a container of pesticide to the opposite end of said tube whereby the pesticide flows through said tube by gravity, and accurately controlled valve means in said tube to control said flow.

Patented March 30, 1971 3,572,554
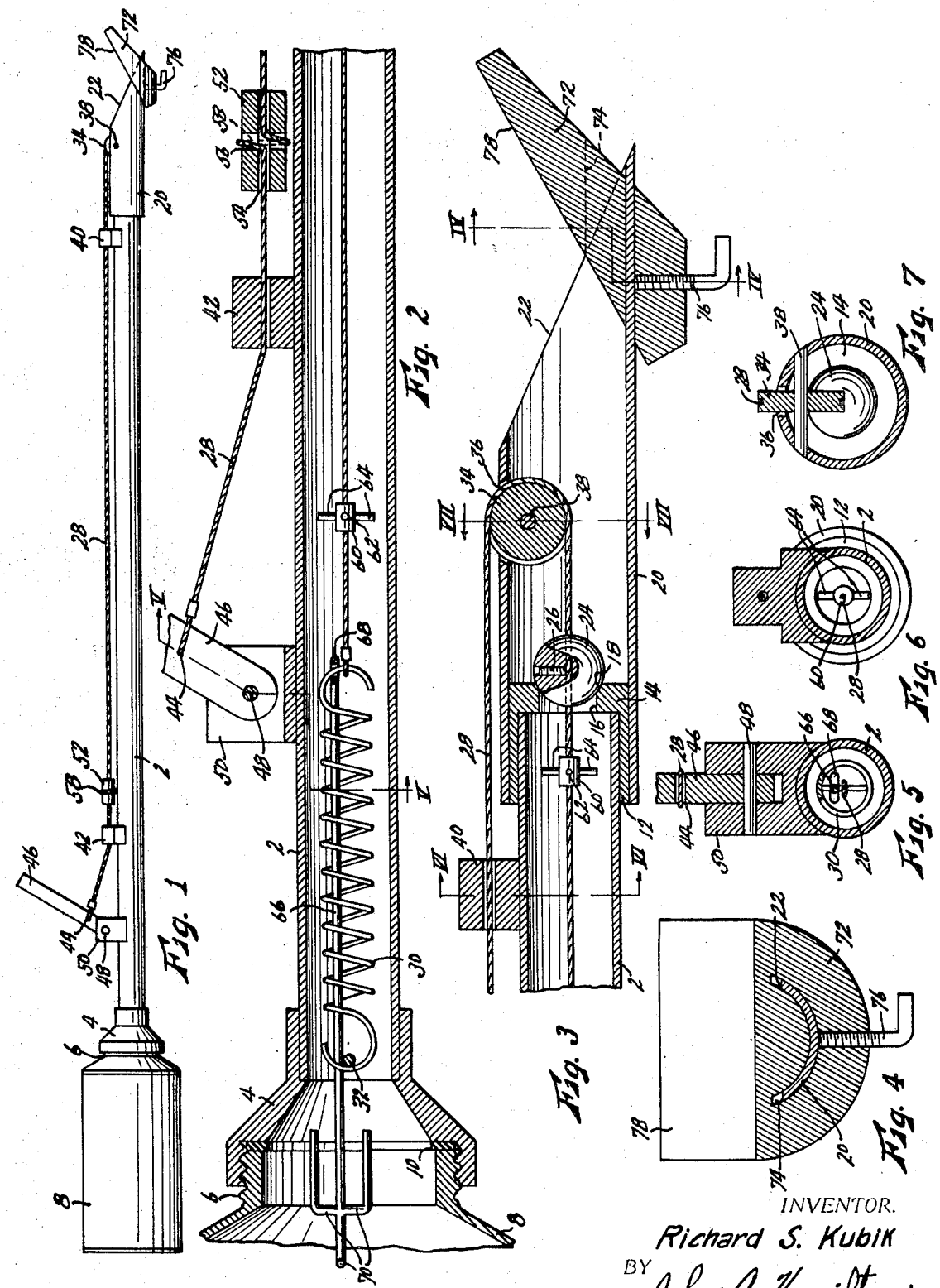
INVENTOR.
Richard S. Kubik
BY John A. Hamilton
Attorney.

PESTICIDE APPLICATOR

This invention relates to new and useful improvements in pesticide applicators, and has particular reference to a device developed to apply cyanide or other pesticides into rodent burrows in the ground. Cyanide pesticides are usually furnished in granular form, and are designed to release a poisonous gas on exposure to moisture. Hence there are the problems not only of providing convenient and effective means for introducing the granular material directly into the subterranean rodent burrow, but also that of maintaining the pesticide in a dry, substantially airtight condition except at the time of discharge below the ground surface. Cyanide pesticides will generally flow freely in the nature of dry sand, so that maintenance of flow thereof through a tube is not difficult. Other pesticides, such as poison-treated grain for example, are effective only on ingestion thereof by the rodents, so that retention thereof in airtight containers is not as important, but are of relatively poor flowability so that the feeding thereof through a tube becomes difficult.

Accordingly, the principal object of the present invention is the provision of a pesticide applicator which solves all of the above enumerated difficulties, in that it both maintains the pesticide in a dry, airtight condition except at the moment of its discharge beneath the ground surface, and provides agitation of the pesticide when needed to maintain flow thereof. To this end, the applicator consists of a tube insertable at one end into a rodent burrow, a pesticide container sealed to the opposite end of the tube, a valve in said tube to control flow of pesticide therethrough, and means for agitating said pesticide in the tube and the container, both the valve and the agitating means being operable by a single control handle.

Another object is the provision of a pesticide applicator of the general character described having means for selectively adapting it when desired to scatter or broadcast granular pesticides over a ground, floor or other surface, rather than depositing it in a burrow.

Other objects are simplicity and economy of construction, efficiency and dependability of operation, lightness of weight and easy portability to any point treatment may be required.

With these objects in view, as well as other objects which will appear in the course of the specification, reference will be had to the accompanying drawing, wherein:

FIG. 1 is a side elevational view of a pesticide applicator embodying the present invention;

FIG. 2 is an enlarged, fragmentary longitudinal sectional view of the left-hand portion of the applicator tube, as viewed in FIG. 1, and related parts;

FIG. 3 is an enlarged fragmentary longitudinal sectional view of the right-hand portion of the applicator tube, as viewed in FIG. 1, and related parts;

FIG. 4 is a sectional view taken on line IV—IV of FIG. 3,

FIG. 5 is a fragmentary sectional view taken on line V—V of FIG. 2,

FIG. 6 is a sectional view taken on line VI—VI of FIG. 3, and

FIG. 7 is a sectional view taken on line VII—VII of FIG. 3.

Like reference numerals apply to similar parts throughout the several views, and the numeral 2 applies to an elongated applicator tube. Said tube may be formed of plastic, metal or any other suitable material, and may be of any desired length, 3 or 4 feet having been found convenient for most purposes. At one end, said tube has an enlarging adapter 4 permanently affixed thereto, said adapter being internally threaded at its larger outer end to receive the externally threaded neck 6 of a container 8 for pesticide. The connection between the container and the adapter is rendered airtight by gasket 10.

Fitted over the opposite end of tube 2, and permanently affixed thereto, is a tubular sleeve 12 having an end wall 14 overlying the end of tube 2, and having an opening 16 formed therethrough coaxially with tube 2 and defining a circular valve seat 18. Applied coaxially over sleeve 12, and permanently affixed thereto, is a tubular tip 20 extending outwardly from valve seat 18. The outer end of said tip is sharpened by being angularly beveled as indicated at 22, for easy insertion into the ground and into a rodent burrow.

Valve seat 18 is controlled by a spherical valve ball 24 carried movably in tip 20 outwardly from said seat. Said valve ball is affixed by means of a setscrew 26 threaded therein on a pliable cord 28 extending diametrically therethrough. Said cord extends inwardly through the valve seat and axially through tube 2, and is affixed to one end of a helical tension spring 30 disposed in said tube, the opposite end of said spring being attached to a cross pin 32 fixed in the rearward end of said tube, and said pin may also serve to secure adapter 4 in assembly with said tube. Thus spring 30 biases valve ball 24 into sealing engagement with valve seat 18. Cord 28 also extends forwardly from valve ball 24, being trained about a pulley 34 rotatably mounted in a window 36 formed in tube tip 20 directly adjacent the beveled end 22 thereof, said pulley being journaled on a shaft 38 fixed in tip 20 transversely to the axis thereof. Externally of tube 2, cord 28 extends rearwardly through a cord guide 40 fixed to the exterior of tube 2 adjacent tip 20, then through a cord guide 42 affixed to tube 2 closer to the rearward end thereof, and is attached at its end, as at 44, to a lever handle 46, in spaced relation from the pivotal mounting of said handle. Said handle is pivoted on a pin 48 extending transversely to tube 2 adjacent the rearward end thereof, and mounted in a block 50 affixed to said tube. Thus, by pulling handle 46 to the rear, cord 28 is caused to pull valve ball 24 away from seat 18, against the tension of spring 30, said valve ball being returned to its seat by said spring whenever said handle is released. The spherical shape of valve ball 24 insures that it will engage seat 18 accurately and in good sealing relation thereto, despite the fact that the pliability of cord 28 may cause said ball to engage said seat at slightly different angles.

The degree to which valve 24 can be opened by handle 46 is limited by a stop 52 applied to cord 28 just forwardly of cord guide 42. Said stop consists of a short tube having a longitudinal bore 54 and a transverse bore 56, as best shown in FIG. 2. Cord 28 extends into one end of bore 54, outwardly through one end of bore 56, is wrapped exteriorly around the stop as indicated at 58, then extends inwardly through the opposite end of bore 56 and outwardly through the opposite end of bore 54. Said stop will not slip along the cord by accident, but can be adjusted therealong by first pulling on wrapped portion 58 of the cord to introduce slack therein. It limits the opening of valve 24 by its engagement with cord guide 42 when handle 46 is pulled. In this manner the valve opening may be regulated to provide a generally uniform rate of flow of pesticide therethrough, despite variations in the grain size and "flowability" of the pesticide.

To maintain flow of pesticide through the tube, despite the tendency of certain pesticides to "bridge" and clog therein, there are attached to cord 28, within tube 2, a plurality of agitators each consisting of a short sleeve 60 secured on said cord by a setscrew 62 (see FIGS. 2, 3 and 6) and having fingers 64 fixed in and extending radially therefrom. Thus each time handle 46 is pulled agitator fingers 64 oscillate longitudinally in the tube, freeing any pesticide which may tend to clog, and insuring a constant flow. Any number of agitators desired may of course be used, in any desired spacing along the cord, but generally two have been found adequate even for materials with low flowability, one adjacent the rearward end of the tube, and one directly behind the valve.

Difficulty is also sometimes experienced in maintaining flow of pesticide from container 8 into the relatively restricted mouth of tube 2, so that agitation in this zone is needed. For this purpose, an agitator rod 66 is extended longitudinally through spring 30, and is attached to the forward or movable end of said spring, as by an eye 68 of said rod. Said rod extends rearwardly from the rearward end of tube 2, and through adapter 4, so as to project into container 8, and is provided at its rearward end with laterally projecting crossarms 70. Thus whenever handle 46 is pulled, it causes rod 66 to be oscillated longitudinally, and crossarms 70 agitate the pesticide in the neck of container 8 to maintain flow of pesticide into tube 2.

The normal usage of the device is believed obvious. The applicator is very light in weight and easy to carry from place to place wherever treatment is required. During periods of nonuse, valve 24 maintains container 8, and tube 2, in an airtight condition, so that air and moisture cannot reach the pesticide therein to cause deterioration thereof, or to cause the generation and escape of poisonous gases, if pesticides of this type are being used. In use, the sharpened tip 20 of the tube is pushed downwardly into the ground, so that its open end is disposed in a rodent burrow or the like, and handle 46 is pulled momentarily to open valve 24 to allow pesticide to flow into the burrow by gravity. Stop 52 is set to allow a generally uniform flow despite variations in the flow characteristics of the particular pesticides being used, and agitators 64 and 70 simultaneously function to insure continuous flow and prevent clogging. If a cyanide or other poisonous gas type of pesticide activated by ground moisture is being used, very little poisonous gas can escape to the atmosphere even at this time, since there is no opening in the tube above ground level through which gas could escape, and since the ground hole pierced by the applicator tends to close when the applicator is withdrawn.

In some cases, rather than injecting the pesticide into a burrow, it may be desired to scatter it freely on the ground, or on a floor or other surface. For this purpose, the applicator is provided with a "scatter" tip 72 consisting of a block having a segmental annular orifice 74 formed therethrough through which the beveled portion of tip 20 may be inserted as shown, the block being releasably fixed thereon by a set screw 76. When so attached, the block has a surface 78 confronting the open end of tip 20, but disposed obliquely to the axis thereof. Thus when the applicator is held with the tip extending downwardly but in the air above the ground, and valve 24 is opened, granular pesticide falls by gravity against surface 78, and is deflected thereby to be scattered widely over the ground surface. Scatter tip 72 is of course detached and not used when using the applicator to inject a pesticide into a burrow.

While I have shown and described a specific embodiment of my invention, it will be readily apparent that many minor changes of structure and operation could be made without departing from the spirit of the invention as defined by the scope of the appended claims.

I claim:

1. A pesticide applicator comprising:
   a. a tube having one end adapted to be inserted downwardly into the ground into a rodent burrow or the like said tube being provided with an apertured partition wall defining a valve seat confronting the open lower end of said tube;
   b. a pesticide container connected to the opposite or upper end of said tube whereby pesticide therefrom may flow through said tube into said burrow by gravity;
   c. a valve closure member movable longitudinally in said tube in cooperation with said seat, whereby to control the flow of pesticide through said tube; and
   d. means for operating said valve closure member, said operating means comprising a pliable strand fixed to said closure member and extending generally coaxially in said tube, a tension spring disposed in said tube intermediate said valve seat and the container end of said tube, said spring being connected at one end to said pliable strand and at its opposite end to said tube, whereby to bias said valve closure member toward said seat a pulley mounted rotatably in said tube intermediate said valve seat and the open end of said tube, said pliable strand being trained about said pulley and extending toward the container end of said tube exteriorly thereof, and a lever pivoted on said tube adjacent the container end thereof on an axis transverse to said tube, the extended end of said pliable strand being attached to said lever in spaced relation from its pivotal axis.

2. A pesticide applicator as recited in claim 1, wherein said valve closure member is supported solely by said pliable strand, and has a spherically curved surface adapted to engage said valve seat accurately despite variations of angularity between the axes of said seat and closure member.

3. A pesticide applicator as recited in claim 1 with the addition of:
   a. a guide for said pliable strand affixed exteriorly to said tube, and through which said strand moves slidably; and
   b. a stop member mounted on and adjustably movable along said strand intermediate said guide and said valve, whereby to regulate the opening of said valve by its engagement with said guide.

4. A pesticide applicator as recited in claim 1 with the addition of:
   a. one or more agitator members affixed to said pliable strand within said tube and including fingers projecting radially from said strand; and
   b. a rigid agitator rod attached to the movable end of said spring and extending parallel to the axis of said tube into the mouth portion of said container, the portion of said rod within said container being provided with radially extending fingers.